Aug. 5, 1941.  A. E. BOSTIC  2,251,655
COMBINE HARVESTER CONSTRUCTION
Filed Aug. 8, 1940  3 Sheets-Sheet 2
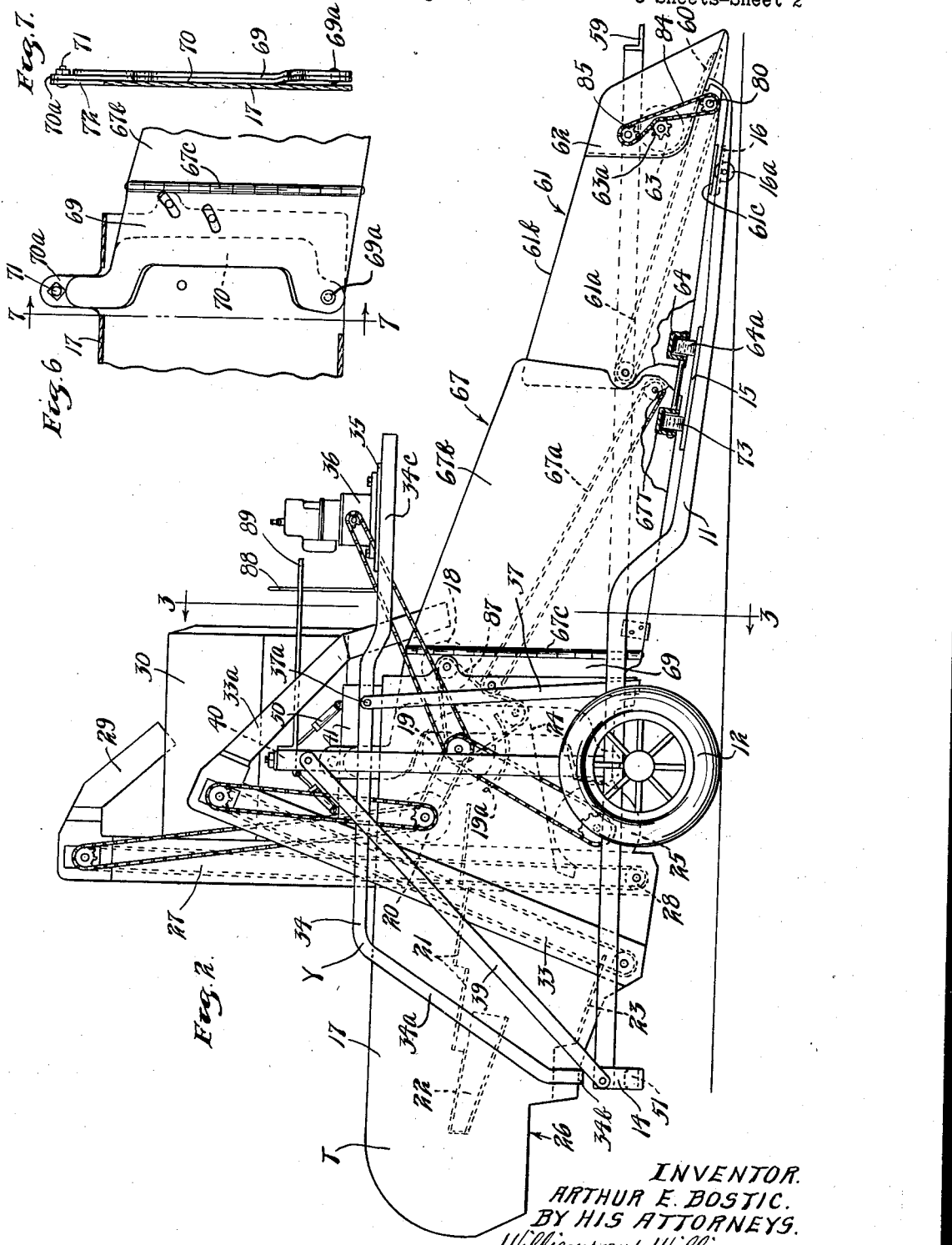
INVENTOR.
ARTHUR E. BOSTIC.
BY HIS ATTORNEYS.
Williamson & Williamson

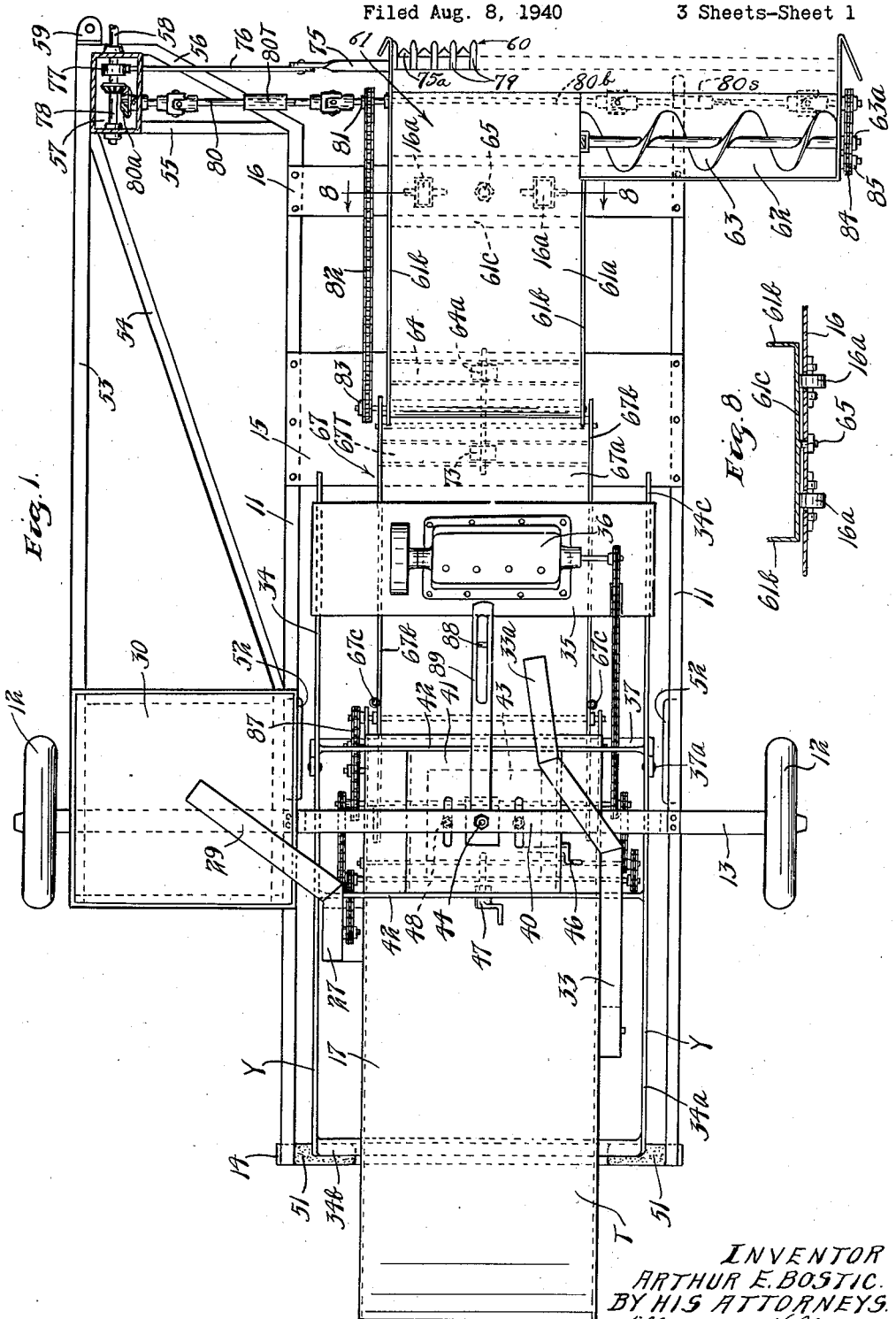

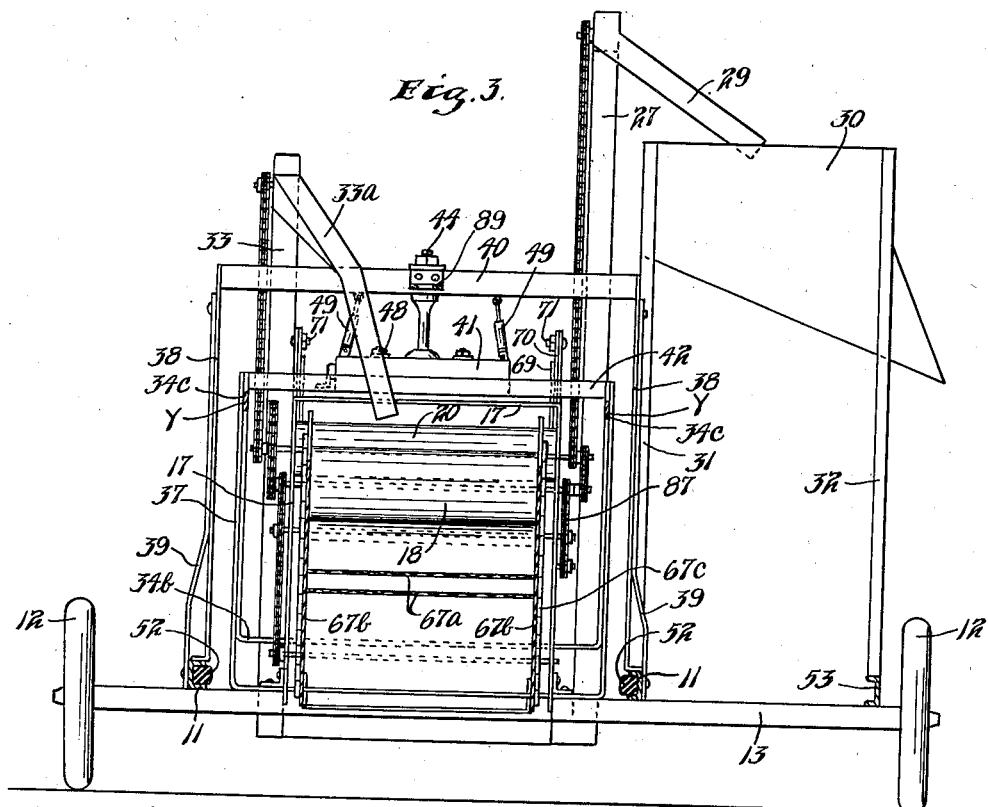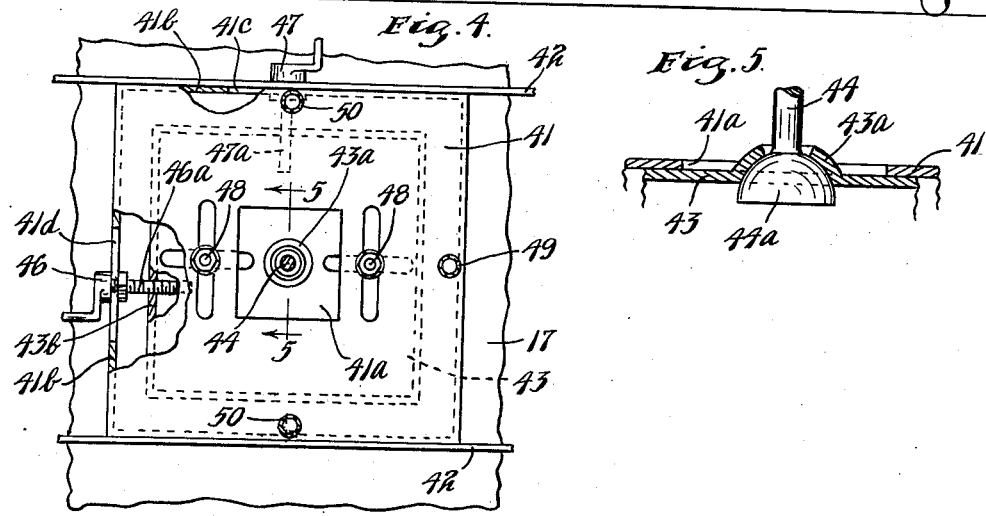

Patented Aug. 5, 1941

2,251,655

UNITED STATES PATENT OFFICE 2,251,655

COMBINE HARVESTER CONSTRUCTION

Arthur E. Bostic, Pipestone, Minn.

Application August 8, 1940, Serial No. 351,872

13 Claims. (Cl. 56—21)

This invention relates to harvesters or combines for grain and the like, and particuarly to a harvester including a thresher unit wherein provision is made for maintaining said unit in normal or horizontal position of the threshing cylinders, carriers, grain pans and grates regardless of side hills or ground irregularities over which the machine is drawn or propelled.

The present combines and harvesters which both cut and pick up grain from the ground and thereafter thresh the same, have proved efficient for operation on substantially level fields. The present combines, however, do not function in a highly efficient manner when passing over side hills or ground irregularities due to the fact that the working parts such as the conveyors, scraping cylinders, rasp bars and beaters are tilted from their normal position and the distribution and feeding of grain to these parts is not uniform. Choking often occurs and inefficient action of the cylinder and other working parts takes place.

It is an object of my invention to provide a harvester for grain and the like which may be drawn or otherwise propelled to either cut or pick up cut grain from the ground and to convey such grain to a thresher unit and thresh the same, separating the grain from the husks and stalks with provision for causing the thresher unit as well as the conveyor to be maintained during travel of the machine over irregular ground, side hills, inclinations and declinations at a uniform or normal operating position, with the important working elements disposed in the position assumed in standard types of harvesters and combines when the machine is operating on level ground.

More specifically it is an object to provide a harvester or combine for grain and the like mounted on a wheeled frame and having a thresher unit supported on said frame in such manner that it is disposed in normal operating position regardless of irregularities and inclines in the ground over which said wheeled frame travels.

It is a further object to provide a combine or harvester of the class described in which the entire thresher unit as well as the principal carrier for conveying grain to the thresher unit is mounted by suspension from the wheeled frame to cause the unit to be maintained during travel of the machine over irregular ground, side hills and inclines in the normal operative position, thereby assuring uniform feeding of the grain to the beater, threshing cylinder, strippers, etc.

A still further object is the provision in a device of the class described of adjustment means associated with the support or suspension of the thresher unit and housing to permit proper balancing of the unit for varying conditions and for proper setting of suspension means.

These and other objects and advantages will more fully appear from the following description made in connection with the accompanying drawings, wherein like reference characters refer to similar parts throughout the views, and in which:

Fig. 1 is a top plan view of an embodiment of my invention applied to a combine of a smaller or lighter type;

Fig. 2 is a side elevation of the same;

Fig. 3 is a cross section taken approximately on the line 3—3 of Fig. 2;

Fig. 4 is a top plan view on a somewhat larger scale showing the adjustment means for the support or suspension of the thresher housing;

Fig. 5 is a detail cross section taken on the line 5—5 of Fig. 4;

Fig. 6 is a detail vertical section showing the connection of the sides of the main grain conveyor with the front of the thresher housing;

Fig. 7 is a cross section taken on the line 7—7 of Fig. 6, and

Fig. 8 is a detail cross section taken on the line 8—8 of Fig. 1.

In the drawings an embodiment of my invention is shown applied to a harvester or combine for cutting the grain or for picking up cut grain from a windrow and for collecting and delivering the grain cut or picked up to a thresher unit, and for thereafter efficiently threshing the grain and delivering the clean grain to a dumping bin mounted on the device.

The combine illustrated has a main wheeled frame comprising a pair of spaced elongated frame beams 11 offset downwardly at their forward ends to support and accommodate the cutter mechanism and the conveyors which receive the cut grain. This frame is mounted on a pair of widely spaced tired wheels 12, a heavy axle 13 connecting said wheels and directly supporting frame members 11. The frame members 11 are connected together and reenforced by a series of transverse beams 14, 15 and 16, respectively.

The thresher unit, indicated as an entirety by the letter T, is of conventional construction for the most part, having mounted within its housing 17 the usual beater 18 at the forward end thereof for cooperating with the rear conveyor to feed the cut stalks or heads into the conventional cylinder 19. The second beater 20 is disposed rearwardly of cylinder 19 and the other conventional parts of the thresher such as the grate 19a, straw racks 21, return pans 22, cleaning sieve 23, grain pan 24, are mounted within thresher housing 17 and associated and designed for cooperative working action in the conventional manner. The usual blower 25 is provided cooperatively associated with the other working parts and causing the chaff, straw and refuse to be discharged through an opening 26 at the rear and bottom of housing 17.

At the left-hand side of the thresher unit a clean grain elevator 27 is mounted receiving at its lower end the clean grain from a screw conveyor 28 and delivering through a spout 29 to the open upper end of a quick dumping bin 30, which dumping bin is supported from the left-hand side of the frame by upstanding posts 31 and 32. At the right-hand side of the machine a slightly inclined elevator 33 is mounted being rigidly connected with the vertical right side of thresher housing 17 and having at its upper end a downwardly inclined delivery spout 33a which returns a part of the grain which is not completely cleaned in the customary manner to the upper end of the second conveyor just forward of the first beater 18.

With my improved construction the entire thresher unit is mounted and related with the wheeled frame in such manner that it will always be maintained in normal operative position with most of the working elements disposed horizontally regardless of the irregularities in the ground over which the machine is propelled. To this end I provide a cradle for the thresher unit comprising, as shown, a yoke designated as an entirety by the letter Y having spaced horizontal bar portions 34 which extend above the top of thresher housing 17 and having downwardly and rearwardly extending arms 34a disposed against the vertical side walls of thresher housing 17 and connected together by a transverse yoke bar 34b which underlies and supports the rear portion of said housing. The horizontal bars 34 of the cradle are extended forwardly some distance beyond the forward end of housing 17 and form the offset bar ends 34c which are joined together by a transverse supporting plate 35 constituting a support for the motor preferably in the form of a small internal combustion engine 36. The said cradle also includes a U-shaped yoke 37 having its vertical arms disposed against the forward ends of the side walls of thresher housing 17 and its horizontal portion underlying and supporting the forward end of said housing. The upper ends of yoke 37 are connected by bolts or other suitable means 37a with the intermediate horizontal portion of the first mentioned yoke.

The said cradle with the entire thresher unit and housing mounted therein is suspended from the main frame of the machine by means of an upstanding U-shaped frame comprising heavy, braced post members 38, each secured at its lower end to one of the horizontal chassis frame members 11 and braced by a diagonal brace 39. The upper ends of the two posts 38 are secured together by a heavy transverse supporting beam 40 from which the cradle is directly suspended.

For adjustable suspension of the said cradle I provide a heavy horizontal plate 41 rigidly connected with the two horizontal yoke bars 34 of the cradle by means of a pair of strong transverse bars 42. A heavy supporting plate 43 underlies and supports plate 41 and through plate 41 and its connected parts, the cradle and thresher unit. Supporting plate 43 has a central ball receiving socket 43a for reception of a semi-ball 44a which is rigidly connected or integrally formed with the depending supporting post 44 which is rigidly affixed at its upper end to the approximate center of the supporting beam 40.

For adjustment of the point of suspension of the cradle and thresher unit the upper plate 41 is recessed rectangularly in its central portion 41a, as shown in Figs. 4 and 5, the ball and socket supporting connection being accommodated in the recessed portion and provision being made to shift plate 43 relatively to plate 41, both longitudinally and transversely of the machine. To facilitate such shifting and adjustment plates 41 and smaller plate 43 are provided with downturned flanges 41b and 43b, and a horizontal slot 41c is formed in the rear flange 41b and a smaller horizontal slot 41d is formed in one of the side flanges 41b. A crank 46 is slidably journalled in the side flange 41a and carries a screw 46a which has threaded engagement with the downturned flange 43b of plate 43 to provide transverse shifting of plate 43. Likewise a second crank 47 is slidably journalled in the slotted rear flange 41b having its inner end provided with a screw 47a which threadedly engages the rear flange of plate 43. Crank 47 causes shifting of plate 43 longitudinally of the machine. To assist in guiding plates 41 and 43 and the shifting of plate 43, cross slots are provided at the appropriate portions of said plates and said plates are further connected by the nutted bolts 48 working in said cross slots. The adjustment means described, including the plates 41 and 43 and the associated adjustment mechanism, permit the cradle and supported thresher unit to be balanced as desired within certain limits, which adjustment is, of course, made when the machine is standing on level ground. Adjustment of the point of suspension longitudinally of the machine is sometimes desirable to cause a slight tilting on a transverse axis of the thresher unit for cutting heavier or lighter grain. The lateral or transverse adjustment is for balance to insure uniform distribution and treatment of the stalks and grain delivered to the thresher.

The suspension mounting for the thresher unit and its cradle includes stabilizers 49 and 50 extending from the heavy supporting beam 40 to points arranged in the corners of a rectangle on upper plate 41. These stabilizers employ piston rods and cylinders and may utilize either hydraulic or spring resistant principles. They check and stabilize the swinging movements both on an axis longitudinal of the machine and transversely thereto as the machine is propelled over side hills or inclines or declines. To further cushion the swinging or impact of the thresher casing and its cradle, resilient cushions 51 are provided beneath the transverse yoke bar 34b which underlies the rear portion of the thresher housing, and additional resilient cushions 52 are mounted on the inner sides of the heavy frame beams 11 medially of the front and rear of the thresher housing.

The motor 36 and heavy supporting plate 35 act as counter-balancing means for the weight of the thresher unit, being so positioned on the forward projecting ends 34c of yoke Y and of such weight as to normally maintain the thresher housing in horizontal position. The machine, as shown, has a side frame comprising forwardly extending members 53 and 54 and cross bar 55 with an angularly bent forward bar 56, and on the forward portion of the frame so formed is mounted a transmission mechanism 57 to receive the power take-off shaft 58 from a tractor or propelling vehicle. A hitch 59 is rigidly secured with the forward end of the said side frame. Adjustable cutter mechanism 60 is mounted at the front of the machine extending not only across the full width of the receiving conveyor 61, but extending beyond the same for a distance somewhat greater than the width of conveyor 61. A pan 62 supported from the forward end of the chassis frame at the right-hand side receives from the outwardly extending portion of the cutter mechanism and has mounted therein a large screw conveyor 63 which is driven to deliver the grain received in pan 62 laterally of the machine to the receiving conveyor 61. Conveyor 61 is of the endless apron type, the apron 61a being mounted between vertical side members 61b forming the frame. The side members 61b are secured together and reenforced suitably and, as shown, a track 64 of inverted channel construction secures the rear and lower portions of the conveyor sides, said track being supported on a roller 64a, which roller is mounted on a cross plate 15 traversing the lower portion of the chassis frame members 11. A transverse plate 61c underlies the forward portion of the conveyor frame and is swivelly connected, as shown in Fig. 8, by a pin 65 with the beam 16 of the conveyor frame. Thus the first conveyor 61 may swivel slightly on a vertical axis and has some limited rocking movement transversely of the frame.

A second conveyor, indicated as an entirety by the number 67, is disposed rearwardly of and receives from the rear end of the conveyor 61, and comprises a conventional endless apron 67a trained over suitable rollers and mounted within a frame having a vertical wall 67b. The forward ends of said walls 67b project beyond and overlap the rear ends of vertical walls 61b of conveyor 61, these parts forming a loose connection between the walls of the respective conveyors. The walls 67b of conveyor 67 have hinged to the rear ends thereof on vertical hinge elements 67c vertical attachment plates 69 which in turn are connected, as shown in Figs. 2, 6 and 7, with the vertical walls and forward portion of the thresher housing, permitting the conveyor 67 to bodily shift laterally of the machine as well as to permit relative swinging movement of the thresher housing to conveyor 67. To this end vertical attachment plates 69 are pivoted by loose rivets or pins 69a at their rear and lower corners to vertical attachment links 70, the upper ends 70a of which are pivoted by bolts 71 to upstanding ears 72 provided above and at the vertical wall sides of the thresher housing. Slots are formed through overlapping portions of plate 69 and the vertical walls of thresher housing 17 to accommodate the conveyor shafts and the beater shaft later to be described. At the bottom of conveyor 67 an inverted transverse channel track 67t is formed having a roller 73 mounted therein for engaging the wide transverse supporting plate 15.

In the embodiment shown the cutter mechanism at the forward end of the machine has the usual cutter bar 75 connected by a pitman 76 with an eccentric 77 mounted on the short driven shaft 78 which is in the transmission mechanism 57. The cutter bar 75 carries the usual cutters 75a working between guards 79 of the cutter mechanism. The endless apron of the conveyor 61 and also the screw conveyor 63 are driven from the flexible shaft take-off indicated as an entirety by the numeral 80, which is driven by bevel gears 80a from the shaft 78 in the transmission mechanism. The flexible shaft take-off includes a central shaft section 80b mounted in suitable bearings provided in the walls 61b of the conveyor frame and a sprocket 81 drives through the medium of an endless chain 82 to the rear roller shaft 83 of conveyor 61. The right-hand end of the flexible shaft take-off 80 is connected by an endless chain 84 with idler sprocket 85, and the shaft 63a of auger conveyor 63 is driven by meshing with the outer side of said chain 84 to reverse the direction of the auger.

The flexible shaft take-off, as shown, includes a sleeve section 80s telescoped with shaft sections between the transmission mechanism 57 and the sprocket 81, and a second sleeve section 80t telescoped with shaft sections between conveyor 61 and the chain drive for auger conveyor 63, the said telescopic connections making provision for limited bodily swinging movement of conveyor 61 on the axis of the bolt 65.

A rigid horizontal arm 39 is secured at its rear end to the beam 40 which suspends the thresher mechanism and extends forwardly having its forward end slotted to receive an upstanding post 88 rigidly secured to the top of the motor support 35. The slotted bar acts as a keeper to confine the post 88 and thereby prevent bodily oscillation of the thresher unit on a vertical axis, that is, the axis of the supporting pin 44.

The motor 37 being mounted on the cradle for the thresher mechanism, has its driving shaft maintained at all times in predetermined relationship with the various shafts of the working parts of the thresher mechanism. Driving connections are shown in Figs. 1 to 3 of the drawings for the various working parts of the thresher including the beater, cylinder, second beater, fan, shakers and elevators, but it is thought unnecessary to describe in detail the specific driving connections as they are more or less conventional for the type of harvesters having an independent motor mounted on the machine for driving the thresher mechanism.

It will be noted, however (see Fig. 2, dotted lines), that the endless apron of conveyor 67 is driven by engagement of a triangularly arranged chain 87 trained over the shaft of the rubbing cylinder 18 and receiving its power therefrom and driving also the first beater. The sprocket of the rear roller for the apron 67a is meshed with the outer side of the triangularly arranged chain 87 to reverse the direction of the chain drive.

In operation the harvester, as shown not provided with the usual reel for cutting grain, is propelled over the ground drawn by a tractor from the hitch 59 and the power take-off from the tractor driving the cutter mechanism, first conveyor and the screw conveyor at the right-hand side of the first conveyor. The rest of the mechanism, including the entire thresher unit as well as the second conveyor, is driven from the motor 36.

As the machine passes up an incline, the entire thresher unit cradled in yokes Y and 37, remains in normal or substantially horizontal position balanced due to its suspension from the heavy suspension pin 44. Likewise, if the machine is drawn over a side hill or over any irregularities, the thresher unit will always remain in the normal position with its essential working elements remaining with their axes horizontally disposed. Likewise, in the travel of the machine over irregular ground the second conveyor frame will shift relatively to the wheeled frame of the combine to prevent tilting of the apron which would cause settling of the grain being conveyed to one side thereof. The shifting movement of the conveyor 67 is compound, limited rocking movement on a longitudinal axis being permitted as well as slight swinging movement and shifting of the side walls of the conveyor and also permitting some longitudinal body movement of the conveyor frame relatively to the connected forward portion of the thresher housing. The latter shifting is permitted through the connection of the parts 69, 70 and 72, as shown in Figs. 6 and 7.

In the shifting movements of the thresher mechanism and second conveyor, the forward conveyor 61 may shift slightly on a lateral rocking movement and on a slight swivel movement on the axis of pin 65 (see Fig. 8).

In the balancing or relative swinging and shifting of the parts, rapid swinging of the thresher unit is checked by means of the stabilizers 49 and 50, and impact against the heavy beams 11 of the frame and against the rear cross member of the frame is cushioned by resilient elements 51 and 52.

The adjustment of the suspension support means through cranks 46 and 47 permit the device to be balanced as desired both laterally and longitudinally of the frame. When cutting heavier grain or where the grain is taller and thicker, it is usually desirable to adjust crank 47 so that the thresher unit is tilted backwardly slightly beyond the normal horizontal position.

From the foregoing description it will be seen that I have provided a comparatively simple but highly efficient combine or harvester construction, particularly in the provision of supporting means for the entire thresher unit and also the conveyors to enable those parts to retain their normal, efficiently operating positions during travel of the machine over side hills, inclines or irregularities. As a result of my improved mechanism the grain, stalks and heads are delivered substantially uniformly over the conveyors to the beater, scraping cylinder and other parts of the thresher mechanism.

It will, of course, be understood that various changes may be made in the form, details, arrangement and proportions of the parts without departing from the scope of my invention.

What is claimed is:

1. A harvester for grain and the like having in combination a wheeled frame adapted to be propelled over a field, a thresher unit, a carrier for conveying grain from adjacent to the ground to said thresher unit, means for supporting said unit from said frame, said means comprising a single connection member attached to the top of said unit permissive of universal swinging movement of said unit relative to said frame, said unit being balanced to be maintained in normal operative position regardless of irregularities in the ground over which said wheeled frame travels, and means for restraining said unit against swinging movement on a vertical axis.

2. A harvester for grain and the like having in combination a wheeled frame adapted to be propelled over a field, a thresher unit, a carrier for conveying grain from adjacent the ground to said thresher unit, means for supporting said carrier with freedom for rocking movement of said carrier on an axis longitudinally disposed of said frame, means for supporting said thresher unit with freedom for universal swinging movement of said unit relatively to said frame, said unit being balanced relative to said supporting means whereby it will be maintained in normal operating position regardless of irregularities in the ground over which said wheeled frame travels, said carrier having a connection adjacent its delivery end with said unit to cause said carrier to swing in unison with said unit on said longitudinal axis.

3. A harvester for grain and the like having in combination a wheeled frame adapted to be propelled over a field, a thresher unit having a housing wherein the working parts are mounted, an overhanging support mounted on said frame, and a ball and socket connection member for supporting said housing from said support, said unit and housing being balanced with reference to said suspension means, said suspension means being permissive of universal swinging movement by gravity of said housing when said wheeled frame travels over irregular ground and means interposed between said housing and said frame for restraining oscillation of said housing on a vertical axis relative to said frame.

4. The structure set forth in claim 3, and stabilizing elements for yieldably resisting swinging movement of said unit in all directions.

5. A harvester for grain and the like having in combination a wheeled frame adapted to be propelled over a field, a thresher unit having a housing wherein the working parts are mounted, an overhanging support mounted on said frame, a vertical universal suspension means for supporting said housing from said support, said unit and housing being balanced with reference to said suspension member, said suspension means being permissive of universal swinging movement by gravity of said housing when said wheeled frame travels over irregular ground, and means for preventing oscillation of said housing on a vertical axis.

6. A harvester for grain and the like having in combination a wheeled frame adapted to be propelled over a field, a thresher unit having a housing wherein the working parts are mounted, a support for mounting said thresher unit on said frame with freedom of said unit to swing on a horizontal axis disposed longitudinally of said frame and also on a horizontal axis disposed transversely of said frame, a carrier for conveying grain to said thresher unit, said carrier having a loose connection with the front of said thresher housing, and a support for mounting said conveyor on said frame with limited freedom for said conveyor to rock on an axis longitudinally of said frame and to also swing on a vertical axis, said connection between said carrier and said housing causing said carrier to swing bodily in unison with said thresher unit.

7. A harvester for grain and the like having in combination a wheeled frame adapted to be propelled over a field, a thresher unit, a support for mounting said thresher unit on said frame with freedom of said unit to swing universally by gravity, counter-balancing means including a motor associated with said thresher unit for balancing said unit in normal operating position, a conveyor for delivering grain to said thresher unit, means for mounting said conveyor for limited bodily swinging movement on a vertical axis, means for driving said conveyor with freedom for said limited swinging movement, driving connections between said motor and the working parts of said thresher unit, and said conveyor having a connection adjacent its delivery end with said thresher unit whereby said conveyor will bodily swing in unison with said unit.

8. A harvester for grain and the like having in combination a wheeled frame adapted to be propelled over a field, a thresher unit having a housing wherein the working parts are mounted, an overhanging support mounted on said frame, adjustable suspension means for supporting said housing from said support, said suspension means including a plate secured to the top of said housing, a second plate shiftable longitudinally of said frame and shiftable also transversely of said frame, and a suspension member having universal connection with said last mentioned plate.

9. The structure set forth in claim 8, and means for readily shifting said second mentioned plate in said directions specified.

10. A harvester for grain and the like having in combination a wheeled frame adapted to be propelled over a field, a thresher unit having a housing wherein the working parts are mounted, an overhanging support mounted on said frame, a thresher unit-supporting member connected with the medial portion of said overhanging support, said member having ball and socket connection with the upper portion of said housing, said thresher unit being balanced with respect to said supporting member to cause said unit to be maintained in normal operating position regardless of irregularities in the ground over which said frame travels, and means for preventing oscillation of said housing on a vertical axis relative to said frame.

11. The structure set forth in claim 10, and said connection between said thresher unit supporting member and the top of said housing including a plate shiftable longitudinally of said housing and connected with said supporting member to adjust the balance of said thresher unit within a certain range.

12. A harvester for grain and the like having in combination a wheeled frame adapted to be propelled over a field, a thresher unit, a support for mounting said thresher unit on said frame with freedom of said unit to swing transversely of said frame and also longitudinally of said frame, said unit being balanced with reference to said support for maintenance in normal, substantially horizontal position, an endless conveyor mounted on said frame for delivering material to said thresher unit, said conveyor having frame sides connected with the forward portion of said thresher unit, means for mounting said frame sides and conveyor for limited bodily shifting movement across said frame and for rocking movement on an axis disposed longitudinally of said frame, said connection between said conveyor frame sides and said unit causing said conveyor to shift in unison with said thresher unit when said wheeled frame travels over irregular ground.

13. A harvester for grain and the like having in combination a wheeled frame adapted to be propelled over a field, a thresher unit, having a housing provided with a pair of spaced, upstanding sides, a support for mounting said thresher unit on said frame with freedom of said unit to swing transversely of said frame and also longitudinally of said frame, said unit being balanced with reference to said support for maintenance in normal, substantially horizontal position, an endless conveyor mounted on said frame for delivering material to said thresher unit, said conveyor having upstanding frame sides having portions lapping the upstanding sides of said housing and connected therewith to shift in unison with said thresher unit when said wheeled frame travels over irregular ground, and means for mounting said conveyor to permit limited bodily shifting movement thereof across said frame and rocking movement thereof on an axis disposed longitudinally of said frame.

ARTHUR E. BOSTIC.